April 14, 1953  C. W. FEHRS  2,634,416
COMBINED SUNGLASSES AND EYESHADE
Filed July 31, 1951  2 SHEETS—SHEET 1
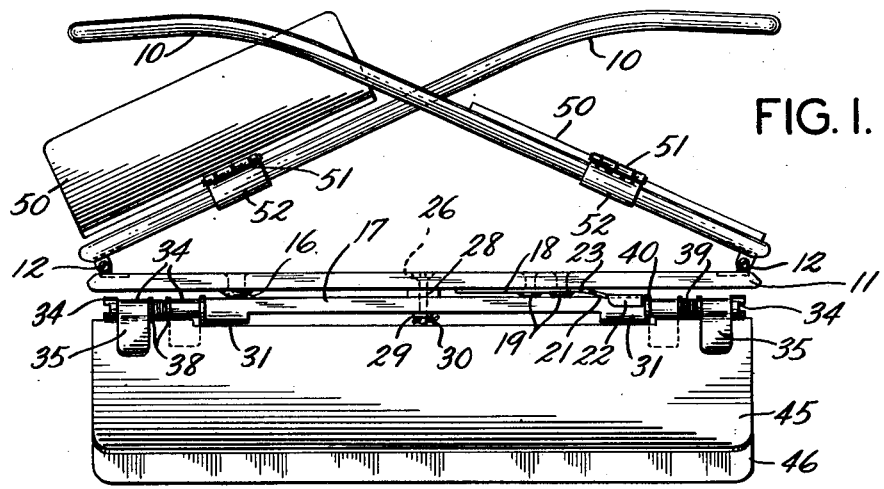
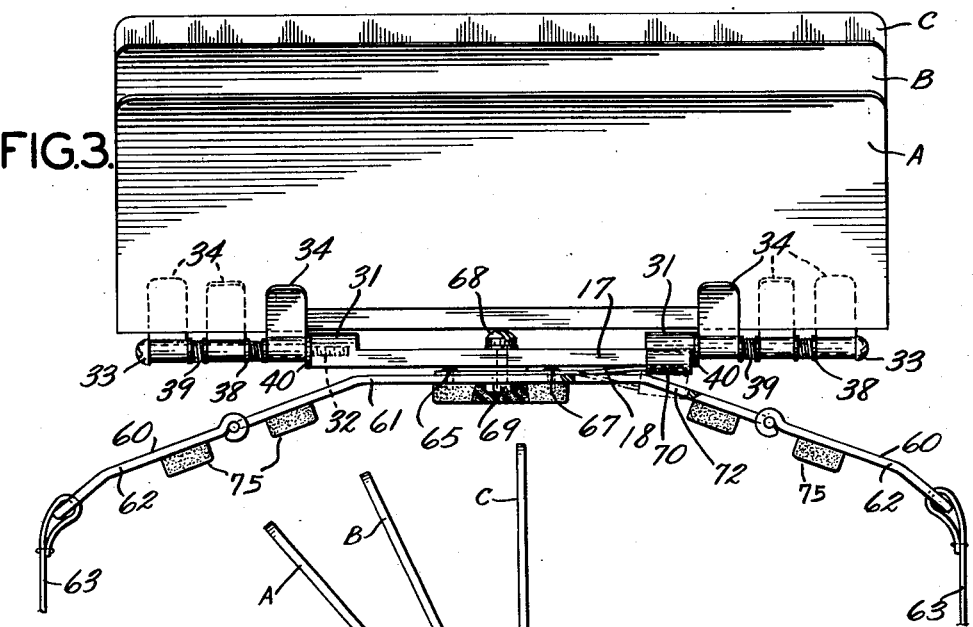
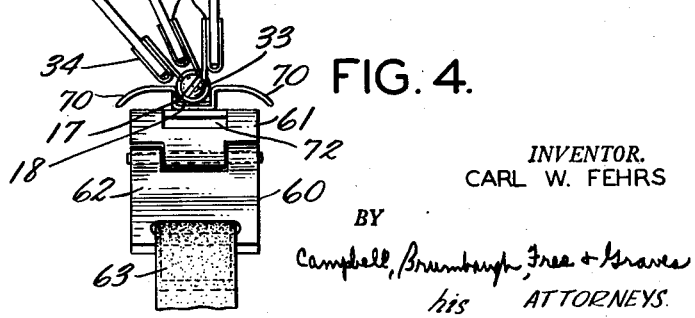
INVENTOR.
CARL W. FEHRS
BY
Campbell, Brumbaugh, Free & Graves
his ATTORNEYS.

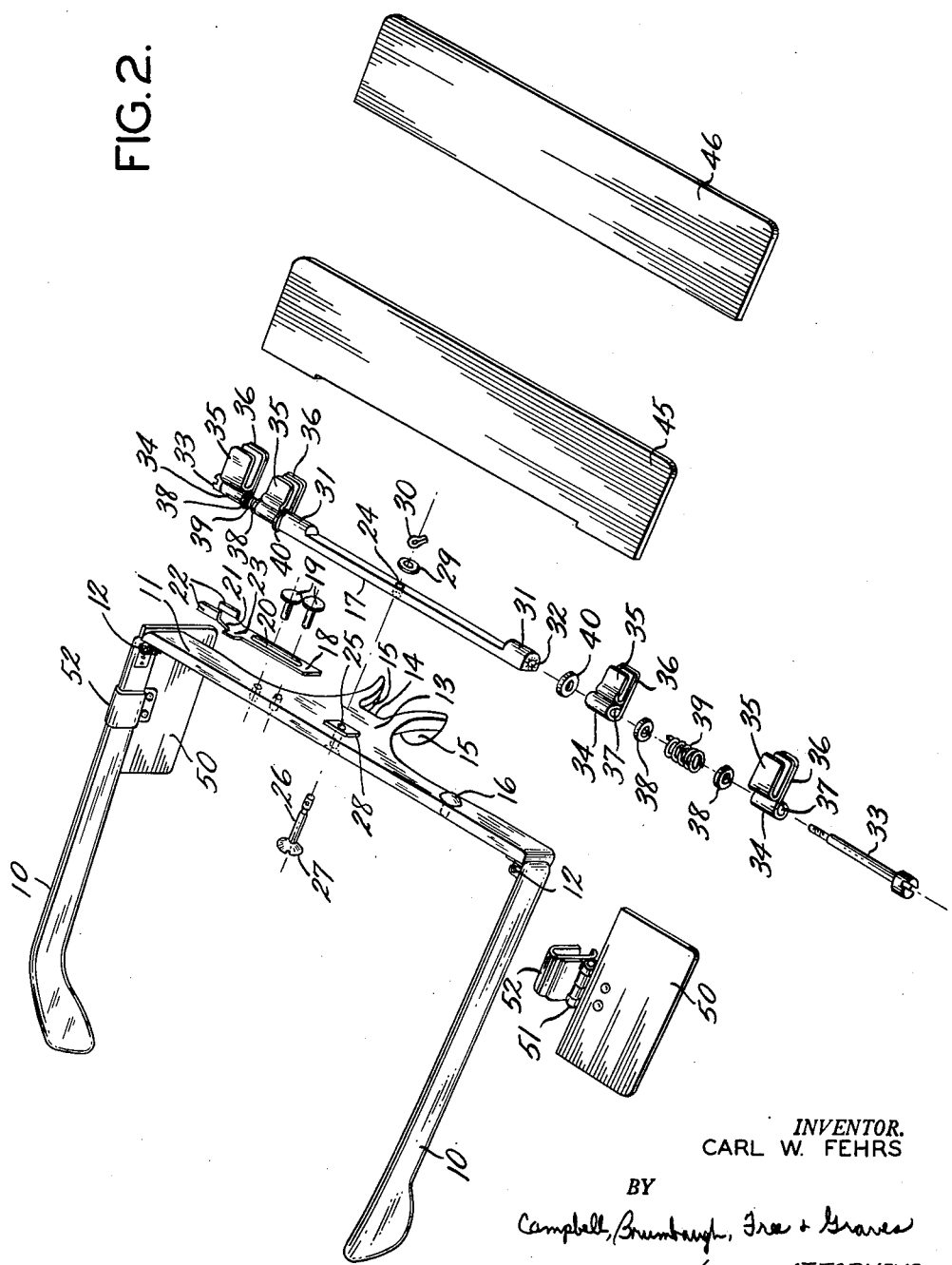

Patented Apr. 14, 1953

2,634,416

UNITED STATES PATENT OFFICE 2,634,416

COMBINED SUNGLASSES AND EYESHADE

Carl W. Fehrs, Ridgefield, Conn.

Application July 31, 1951, Serial No. 239,567

6 Claims. (Cl. 2—12)

The present invention relates to a combined sunglasses and eyeshade; more particularly, it relates to a combined sunglasses and eyeshade having a plurality of visors adapted to be individually and separately adjusted.

There have been described many types of eyeshields and sunglasses which have been designed to accomplish various particular purposes. Thus, there have been eyeshields having superimposed lenses which may be of different colors or different optical properties especially designed for use in welding and similar uses in which the eyes of the wearer are subjected to intense light and glare. These have been designed so that either one or all of the lenses may be removed by one or a number of different devices which in normal adjustment hold the lenses in place. Eyeglasses with colored visors to eliminate color or to reduce the intensity of light have been designed for use by persons who drive or are engaged in sports or activities where their eyes are subjected to intense artificial light or sunlight. Eyeglasses have also been designed which provide for a pair of lenses which are separately adjustable in the line of vision of the wearer so that he may have either the benefit of the protection of the lenses or clear unobstructed vision by a slight change in the angle of his head. A number of designs of glasses and goggles have been made with the primary purpose of fitting the lenses to the contour of the wearer's face so that he may have relatively unobstructed vision in all directions while enjoying shading over the maximum area of vision. These designs have been more or less satisfactory for the particular purposes for which they have been designed. However, all of them are subject to various disadvantages in that they may be cumbersome, not easily adjusted or altered, the lenses not easily removed or replaced, or the connections tend to become worn and loose. The present invention is designed to provide an improved combined sunglasses and eyeshade which will include the advantages and functions of previous designs, but without the disadvantages found in the earlier glasses.

It is, therefore, an object of the present invention to provide a combined sunglasses and eyeshade which will give maximum protection to the eyes of the wearer.

A further object of the invention is to provide sunglasses and eyeshade with a plurality of visors with desirable optical properties.

A still further object of the present invention is to provide a combined sunglasses and eyeshade having a plurality of visors hinged for individual separate adjustment and adapted to be rotated to change the position of the lenses.

Another object of the present invention is to provide a combined sunglasses and eyeshade having a plurality of visors of optical properties which may be readily removed and replaced or easily altered in relative position on a supporting carrier.

Other objects will be clear to those skilled in the art from the following description and the accompanying drawings, in which:

Figure 1 represents an embodiment of the present invention;

Figure 2 is an exploded view of the embodiment of Figure 1 showing the construction of the sunglasses in detail;

Figure 3 is a modification of the invention; and

Figure 4 is a side view of the modification of the invention of Figure 3.

The different views in the drawings illustrate two modifications of the present invention in some detail and similar parts in the various figures are given the same reference numbers.

Referring particularly to Figures 1 and 2, there is illustrated an embodiment of the combined sunglasses and eyeshade of the present invention in which the numeral 10 designates bows of the eyeglasses which are adapted to be worn over the ears and along the sides of the head as in conventional eyeglasses. The bows are hinged to a frontal carrier 11 by the bow hinges 12. The frontal carrier 11 is connected to a nasal bridge 13 which carries a recessed portion 14 to accommodate the nose of the wearer and may be provided with flanges 15 which are designed to rest along the sides of the nose of the wearer and to support the glasses on the face of the wearer.

The frontal piece 11 is provided with an embedded spherical-headed retaining stop 16 which in normal adjustment bears against the rear surface of a carrier shaft 17. A spring clip 18 is slidably attached to the frontal piece as by a pair of brads 19 which pass through a slot 20 in the clip and are embedded in the frontal piece. By this arrangement the clip can be slipped laterally along the frontal piece. The clip is provided with a spring section 21 which is bent outwardly as shown, and with a doubly flanged section 22 adapted to engage a section of the shaft 17. In this manner pressure is continuously applied by the spring to the shaft and against the spherical retaining button. The spring clip is further provided with a flange tip 23 by which movement of the clip may be effected. By application of slight pressure upon the tip, the clip may be sprung backward and slipped laterally to the side so that the flanges 22 are out of engagement with the shaft 17.

Shaft 17 is also provided with a centrally located hole 24 which is designed to coincide with a centrally located hole 25 in the frontal carrier and to receive the stem 26 of a stud 27 when assembled. The hole 25 in the frontal carrier is covered with a spacer 28 to set apart the frontal carrier and the shaft and to provide space for the retaining stop 16 which takes up the spring from the spring clip 18. The stem of the stud extends through the holes in the carrier and the shaft respectively and carries a spacer 29 in front of the shaft 17. The stud is held in position by a pin or a snap ring 30.

The carrier shaft 17 is provided at either end thereof with bosses 31 which are provided with internally threaded sections 32 adapted to receive end-threaded bolts 33. In Figure 2 only one side of the assembly carried by the end-threaded bolt 33 is illustrated in detail. The assembly consists of a pair of hinged clips 34 which may be designed from a single strip of spring metal which is bent into a U-shaped clip-engaging section 35 and a straight section 36 which is bent back against one side of the U-shaped section. The free end of the straight section is bent back upon itself to form the hinge eye 37 which fits snugly about the shank of the end-threaded bolt. The free end of one of the pair of clips is bent toward the U-shaped clip on-center of the clip and the free end of the other hinged clip is bent away from the U-shaped section off-center of the clip. The U-shaped clips are separated from each other on the shaft of the bolt by a pair of spacers 38 between which is inserted an expanded helical spring 39. The innermost clip is separated from the boss 31 by a washer 40. In assembly the bolt 33 is screwed into the boss 31 and tightened so that the spring 39 is compressed and thereby continuously exerts pressure against each of the hinged clips.

By the construction of the carrier clips 34, there is presented a pair of clip-engaging sections at each end of the carrier shaft, one on a line above the other. The relative positions of the individual clips at either end of the shaft is immaterial but it will usually be preferred to assemble the clips in such a manner that the upper clips will be on the outer extremities of the bolts 33 and the lower clips will be on the inner side of the bolts at each end of the shaft. The clips are designed to engage visor shields 45 and 46 respectively.

The glasses may also be provided on each side with shields 50 which are connected by a hinge 51 to a bow-engaging clip 52. The shield may be of any suitable material such as colored glass or plastic material.

Another modification of the invention is illustrated in Figures 3 and 4, in which the supporting member is a strip 60 which is designed to be fastened about the head of the wearer. This strip may be made in several sections such as a rigid supporting section 61, a hinged pair of second sections 62 and a pair of flexible straps 63 which can be fastened together in back of the head. The supporting member may also be a single continuous strip 60 as of flexible leather. This modification is shown with three visor shields A, B, and C, and the supporting section 61 is provided with a retaining stop 65 which engages and holds the shaft 17 in position. The bolts 33 at either end of the supporting shaft are of sufficient length that they will carry additional spring clips 34 for the accommodation of the three visor shields A, B, C. The three spring clips on each end of the shaft are separated by spacers 38 and springs 39, as described above. The spring clip 18 may be slightly modified and rigidly fastened to the supporting member 60 by a pin 67 and a bolt 68. The bolt is fastened by a nut 69 and connects the shaft 17 with the supporting member. The spring clip has a pair of flanges 70 which may be pushed inwardly to take the spring clip out of engagement with the shaft 17. The supporting member is provided with an opening 72 into which the shank of the spring clip may drop when pressed to release the shaft for rotation as described more fully below. Pads 75 are pliable cushions of suitable material such as rubber, which rest against the head of the wearer of the glasses.

From the foregoing description it may readily be seen that the visor shields, or eyeshades, consist of a plurality of optical lenses which may be separately and individually adjusted in any position relative to the line of vision of the wearer, and which will remain in the adjusted position. In addition to the frictional engagement which is supplied by the body of the bolts which carry the U-shaped clips, the compressed helical spring will furnish additional force to prevent movement of the clips, and thereby of the shields, from any adjusted position. It will be understood that the shields may be of the same material or they may be of different material and of different optical properties. Any desired combination of properties may thereby be provided merely by selecting visor shields of different properties and combining them in suitable arrangement. Thus one or more of the shields may be particularly adapted to cut down the intensity of the light which it transmits, or one or more of the shields may possess light-polarizing properties, and one or more of the shields may be of different colors or may selectively filter out specific colors of light.

With the specially designed clip-engaging sections of the U-shaped clips it will be seen that the respective shields may be quickly and readily removed and replaced should it become necessary to replace them. By this means, the order in which they are superposed may be readily changed. However, if it is merely desired to change the relative position of the shields so that, for example, light may be transmitted through only the opposite shield, the shaft 17, and therewith the shields may be rotated through an angle of 180° to reverse the order of the position of the shields. If it is then desired to reverse the order again, the shield may be rotated again through another 180°, making a total revolution of 360°. In other words, the shields can be completely rotated about the axis provided by the stem of the stud 27 or bolt 68.

In the modification illustrated in Figures 3 and 4, in which three shields are provided, it may be appreciated that this can provide as many as the following five combinations of lenses: A, A—B, A—B—C, C, or C—B with a single setting of the three lenses. Other combinations may be had by changing lens B with either A or C and rotating the carrier shaft 17 through half revolutions of 180°.

If it is not required or desired to provide for the rotation of the shields to reverse the order of position of the shields, the assembly may be slightly modified to eliminate the carrier 17, the spring clip device 18 and the associated retaining stop from the frontal piece. In this modification the end-threaded bolts 33 and the clips 34, springs 39, washers and spacers associated therewith may be fixed directly into the frontal piece 11.

I claim:

1. Combined sunglasses and eyeshade, comprising a frontal piece, means to support the frontal piece above the eyes of a wearer, substantially coaxial bolts adjacent opposite ends of and supported by said frontal piece, a plurality of clips adjacent to each end of said frontal piece, each clip having a sleeve portion rotatably mounted on one of said bolts, and said sleeves being mounted on said bolts in end to end relation, friction means on said bolts and interposed between the ends of the sleeves on the respective bolts to oppose rotation of said sleeves, and a plurality of transparent shields substantially coextensive with the length of said frontal piece, each shield being detachably received adjacent each end in a different clip at opposite ends of said frontal piece, said clips supporting said shields for pivotal movement, individually and in groups, into positions in front of and away from the eyes of the wearer.

2. Combined sunglasses and eyeshade, comprising a frontal piece, means to support said frontal piece above the eyes of a wearer, a carrier member mounted on said frontal piece and movable relative thereto to reverse it end for end with respect to said frontal piece, a plurality of clips pivotally mounted on each end of said carrier member adjacent to the ends of said frontal piece, said clips being substantially in axial alignment and pivotal about a common axis, a plurality of transparent shields, each shield being releasably supported adjacent each end by a different clip at each end of said carrier member, and friction means interposed between said clips at each end of said carrier member to retain the shields supported thereby in selected pivoted positions.

3. The combined sunglasses and eyeshade set forth in claim 2 in which the carrier member is pivotally connected at about its center to about the center of said frontal piece for rotation in a plane substantially parallel with said frontal piece to reverse the carrier member end for end with respect to said frontal piece.

4. The combined sunglasses and eyeshade set forth in claim 2, comprising means connecting said carrier member to said frontal piece for rotation in a plane substantially parallel with said frontal piece, and a releasable latch means to retain said carrier member against rotation relative to said frontal piece.

5. Combined sunglasses and eyeshade comprising a frontal piece, means to support the frontal piece above the eyes of a wearer, a carrier member mounted on said frontal piece and movable relative thereto to reverse it end for end with respect to said frontal piece, substantially coaxial bolts at opposite ends of said carrier member and adjacent to the ends of said frontal piece, a plurality of clips at each end of said carrier member, each clip having a sleeve portion rotatably engaging and supported by one of said bolts, said sleeve portions being supported on said bolts in end to end relation, friction means on said bolts engaging the ends of sleeves to oppose their rotation, and a plurality of transparent shields substantially coextensive with the length of said carrier member, each shield being detachably connected adjacent each end to a different clip at opposite ends of said carrier member, said clips supporting said shields for pivotal movement, individually and in groups, into positions in front of and away from the eyes of the wearer.

6. The combined sunglasses and eyeshade set forth in claim 5, comprising pivot means connecting said carrier member to said frontal piece for relative rotation in a plane substantially parallel with said frontal piece to reverse said carrier member end for end.

CARL W. FEHRS.

References Cited in the file of this patent

UNITED STATES PATENTS

| Number | Name | Date |
| --- | --- | --- |
| 624,445 | Bennum | May 9, 1899 |
| 1,570,254 | Humes | Jan. 19, 1926 |
| 1,725,340 | Castriotis | Aug. 20, 1929 |
| 2,393,955 | Baratelli et al. | Feb. 5, 1946 |
| 2,459,021 | Frommer | Jan. 11, 1949 |